March 9, 1965  S. J. ERST  3,173,138
F.M. CONTINUOUS WAVE RADAR SYSTEM
Filed March 12, 1959  3 Sheets-Sheet 1
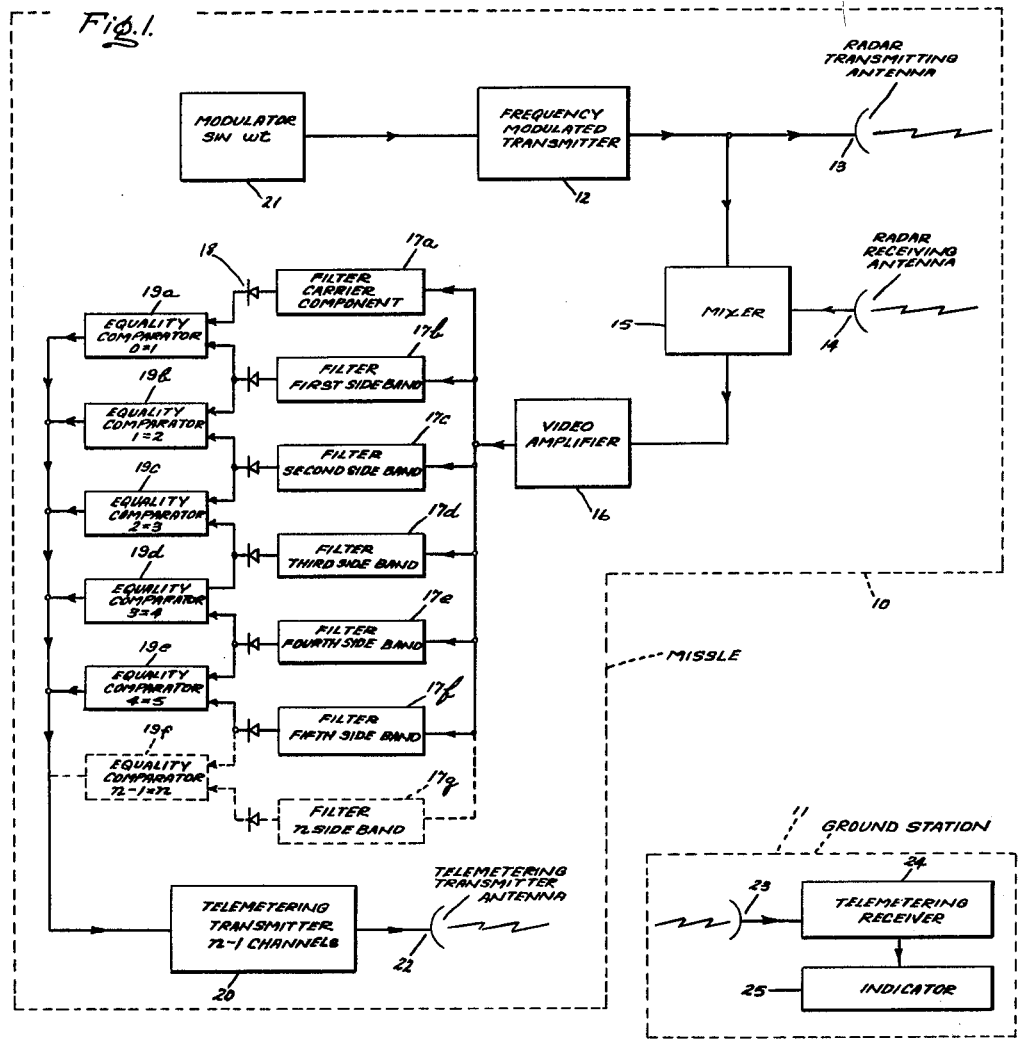
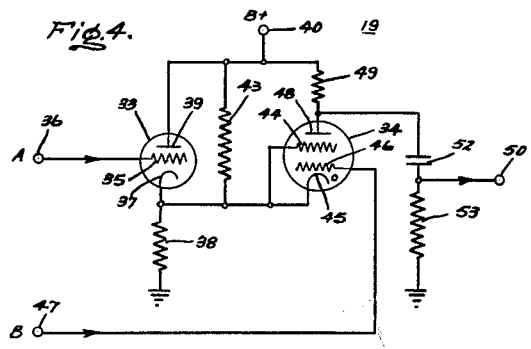
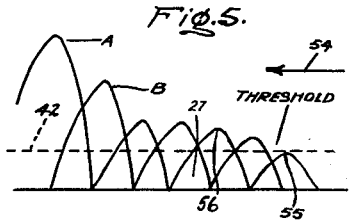
Inventor:
Stephen J. Erst,
by Just & Irish
Attorneys.

March 9, 1965   S. J. ERST   3,173,138
F.M. CONTINUOUS WAVE RADAR SYSTEM
Filed March 12, 1959   3 Sheets-Sheet 2
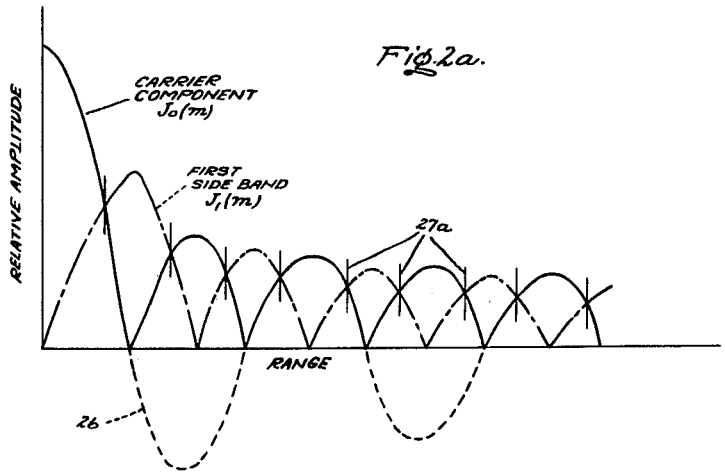
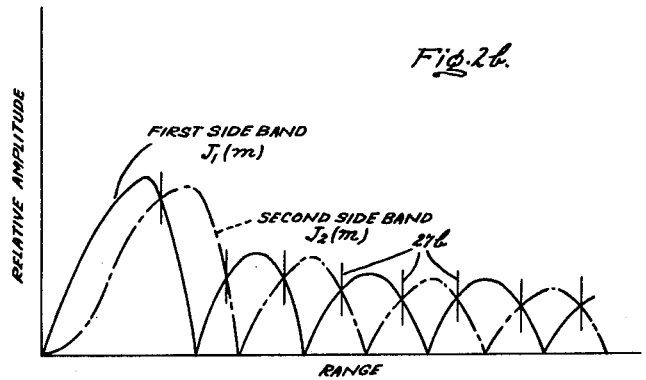
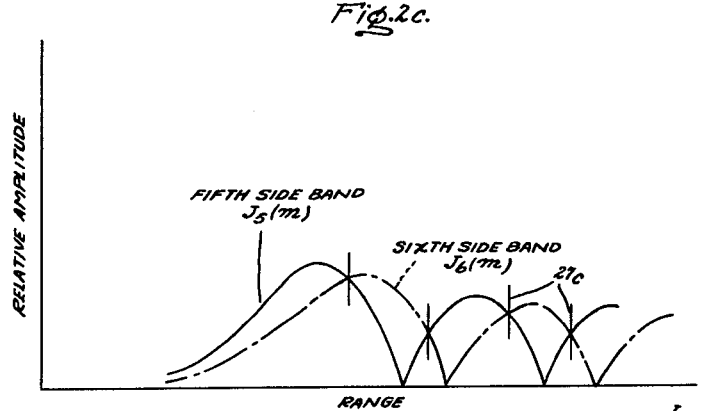
Inventor:
Stephen J. Erst,
by Gust & Irish
Attorneys.

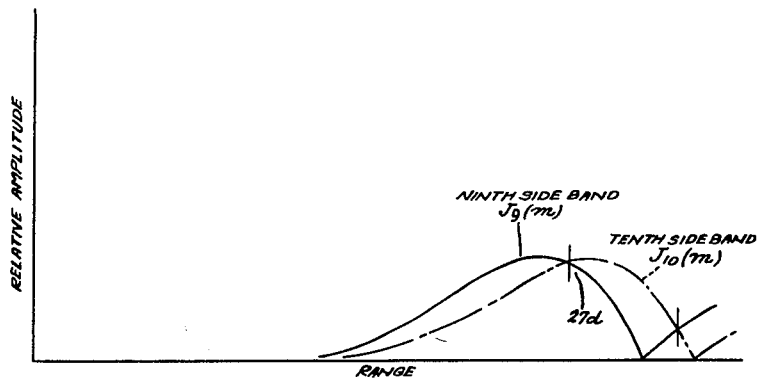
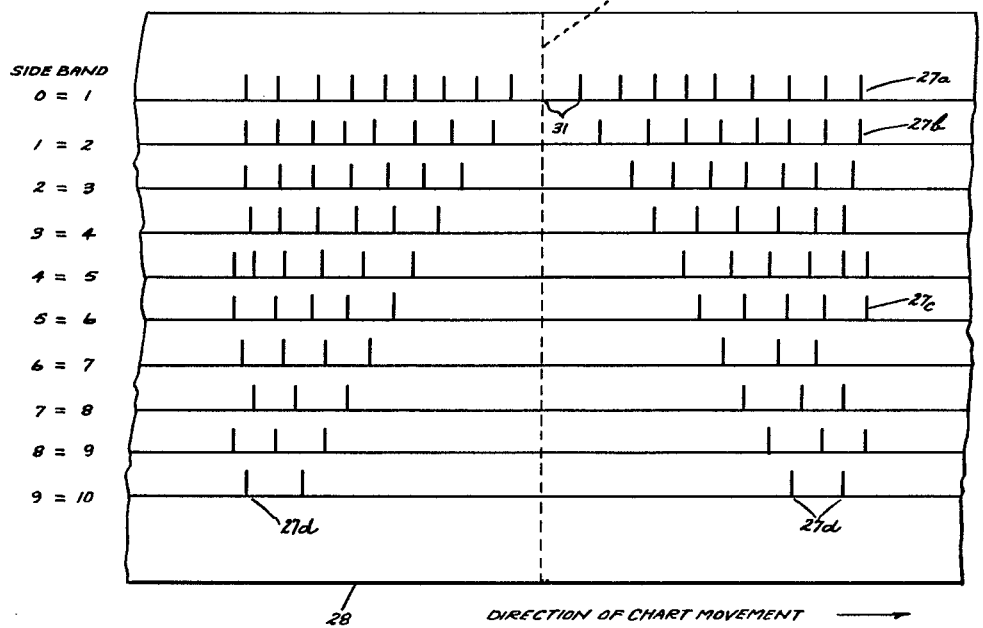

United States Patent Office 3,173,138
Patented Mar. 9, 1965

3,173,138
F.M. CONTINUOUS WAVE RADAR SYSTEM
Stephen J. Erst, New Haven, Ind., assignor to International Telephone and Telegraph Corporation
Filed Mar. 12, 1959, Ser. No. 799,047
7 Claims. (Cl. 343—14)

This invention relates generally to radar systems, and more particularly to a radar system of the frequency modulated continuous wave type including means for extraction of range information.

Conventional radar systems for providing range information, i.e., the instantaneous location of a distant target, have employed pulse techniques; in order to provide range information at close distances with such pulsed radar apparatus, extremely short pulse widths are required and in addition, such conventional pulsed radar equipment has required complex, heavy and expensive components.

In another type of radar system, which has been referred to as an FM-CW system (frequency modulated-continuous wave), the transmitted signal is continuously frequency modulated by a single sinusoidal signal and a portion of the transmitted signal is mixed with the received signal. Analysis of the spectral content of the resulting signal output of the mixer reveals that the individual side bands have an amplitude which is range dependent. While the FM-CW radar system is characterized by its simplicity and small size and weight compared with the more conventional pulsed radar equipment, to the best of the present applicant's knowledge, use of the FM-CW radar system has been limited to applications in which it is desired to provide an output signal when the target is at a given range from the transmitting equipment and at no other time, such systems being conventionally referred to as "range limited."

There is a requirement for a device capable of evaluating the effectiveness of weapons against air targets, the information of principal interest being the "miss-distance." Present techniques for supplying mis-distance information employ conventional fixed pulsed radars, either singly or in triangulation pairs, theodolites, chase planes, etc. Miss-distance information secured in such manners is costly and not always satisfactory.

It is desirable therefore to mount radar apparatus in the drone itself which will supply the miss-distance information. However, since the obvious region of greatest interest is that approaching zero (collision), this extremely close zone of interest causes severe restrictions on the radar system and virtually precludes the employment of conventional pulsed radar apparatus.

I have found that the FM-CW radar system can be employed as a miss-distance indicator, the FM-CW radar apparatus in the missile providing an indication of the closest point of approach of the missile relative to the target, this indication being transmitted to a surface-based monitor for display or recording, as desired. In accordance with my invention, range information is extracted from the FM-CW system by comparison of the side band amplitudes in the output of the mixer. More particularly, in accordance with my invention, at least two side bands contained in the output of the mixer are filtered and fed to a comparator which compares the amplitudes of the two side bands and determines the instants of equality greater than zero between the two side bands, these "instant of equality" signals providing the requisite range information.

It is accordingly an object of my invention to provide an improved FM-CW radar system with means for extracting range information.

Another object of my invention is to provide an improved miss-distance indicating system.

A further object of my invention is to provide an improved miss-distance indicating system employing FM-CW radar type apparatus.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a schematic block diagram showing the preferred embodiment of my invention;

FIGS. 2a, b, c and d, respectively show the amplitude comparison of the carrier component and first side band, first side band and second side band, fifth side band and sixth side band, and ninth and tenth side bands in my improved system;

FIG. 3 is a diagram showing the instant of equality signals for each of the channels of my improved system of FIG. 1, as recorded by the indicating apparatus;

FIG. 4 is a schematic diagram showing a particular form of voltage comparator which may be employed in the system of FIG. 1; and FIG. 5 is a diagram showing the comparison of two adjacent side bands useful in explaining the mode of operation of the circuit of FIG. 4.

Referring now to FIG. 1, my improved system for extracting range information from an FM-CW radar system is shown embodied in a miss-distance indicator, that portion of the system within the dashed-line box identified as 10 being located in a drone, and that part within the dashed-line box identified as 11 being ground-based at a fixed location. In accordance with my invention, I provide a frequency modulated transmitter 12 which is continuously frequency modulated by a high purity sinusoidal wave provided by modulator 21. The modulation is preferably relatively low frequency compared to the carrier frequency, but with a moderately high deviation so that the resulting modulation index "B" is such that many side bands are generated in the resulting frequency modulated signal. Since the system will generally be operated in the microwave region, the frequency modulated transmitter 12 may conventionally be a klystron tube, a suitable carrier frequency being 9000 mc. and a suitable modulation frequency being 200 kc. The output of the frequency modulated transmitter 12 is fed to transmitting antenna 13, which may be of any conventional type, the signal being then radiated by the transmitting antenna 13 to the missile, being reflected therefrom and picked up by the receiving antenna 14. A portion of the transmitted signal is fed to a suitable mixer 15, the received signal picked up by the receiving antenna 14 being also fed to mixer 15; mixer 15 may be of the type commonly referred to as a "Magic T" mixer.

Mixing of the returned signal with a portion of the transmitted signal provides in the output circuit of the mixer 15 a signal containing side bands of frequency zero and harmonics of the modulation frequency; since the mixer 15 functions as a first detector in which the A.C. carrier signal is removed, the carrier component in the output signal of mixer 15 actually has only a D.C. component representing the Doppler frequency. The output signal from the mixer 15 is amplified by a conventional video amplifier 16 with the side band signals being respectively filtered by band pass filters 17. The individual side band signals which are filtered out of the mixer output by the filters 17 are then detected by second detectors 18 with the adjacent side band signals being fed to equality comparators 19. Comparators 19 determine the instant of equality greater than zero between adjacent side band signals, these "instant of equality" signals being fed from comparators 19 to telemetering transmitter 20. It will now be seen that if "$n$" side bands are employed (0 through $n$), $n$ filters 17 will be provided, there being then $n-1$ comparators 19 and telemetering transmitter 20 having $n-1$ channels. Telemetering transmitter 20 feeds antenna 22 which transmits the signals from the telemetering transmitter 20 to receiving antenna 23 of telemetering receiver 24 in the ground station 11. Telemetering receiver 24 in turn feeds an appropriate indicating or recording device 25. As will be hereinafter more readily apparent, recording of the "instant of equality" signals provides the requisite range information, and most particularly the desired miss-distance information.

More particularly, mixing of a portion of the frequency modulated transmitted signal and the time delayed return signal by mixer 15 provides a mixer output of $$v = b \sum_{-\infty}^{\infty} J_n(M) \sin\left[-\frac{2\omega D}{C} + n\left(\mu t - \frac{\mu D}{C}\right)\right]$$

where:

$v$ is the detected signal
$b$ is dependent upon signal amplitude and system gain and represents the summation of the losses and gains in the system such as attenuation, target reflectivity, propagation losses, etc.
$M = 2\beta \sin \frac{\mu D}{C}$
$D$ is distance
$C$ is velocity of propogation
$\mu = 2\pi f$ where $f$ is the modulating frequency
$t$ is time
$\beta$ is the modulation index
$n$ is the side band number The above expression is derived as follows:

Let $E = A \cos \theta$ where:

$E$ = transmitted wave
$A$ = a constant
$\theta = \omega t + B \cos \mu t + \delta$
$w = 2\pi F$
$F$ = carrier frequency
$\mu = 2\pi f$
$f$ = modulation frequency
$\delta$ = a constant The transmitted wave is reflected from a target at range $D$, attenuated and returned to the receiver antenna.

Let $e = a \cos \phi$ where:

$e$ = return wave
$\phi = \omega(t-T) + B \cos \mu(t-T) + \delta$
$a$ = constant
$T = 2D/c$ The phase difference between the transmitted and the return waves $E$ and $e$ can be expressed as $\Delta$.

Let $\Delta = \phi - \theta$ where:

$\Delta$ = phase difference
$\phi = \omega(t-T) + B \cos \mu(t-T) + \delta$
$\theta = \omega t + B \cos \mu t + \delta$ subtracting:

$$\Delta = [\omega t - \omega T + B \cos \mu(t-T) + -\omega t - B \cos \mu t - \delta]$$
$$\Delta = -\omega T + B[\cos \mu(t-T) - \cos \mu t]$$

expanding as the product of 2 angles:

$$\cos B - \cos A = 2 \sin \tfrac{1}{2}(A+B) \sin \tfrac{1}{2}(A-B)$$

where:

$B = \mu(t-T)$
$A = \mu t$
$A + B = 2\mu t - \mu T$
$A - B = \mu T$ substituting:

$$[\cos \mu(t-T) - \cos \mu t]$$
$$= 2 \sin 1/2 \, (2\mu t - \mu T) \sin 1/2 \, (\mu T)$$
$$= 2 \sin (1/2)(2)\left(\mu t - \frac{\mu T}{2}\right) \sin (1/2)(2)\left(\frac{\mu T}{2}\right)$$
$$= 2\left[\sin\left(\mu t - \frac{\mu T}{2}\right) \sin\left(\frac{\mu t}{2}\right)\right]$$

where:

$$T = \frac{2D}{C}$$

then $$[\cos \mu(t-T) - \cos \mu t] = 2\left[\sin\left(\mu t - \frac{\mu D}{C}\right) \sin \frac{(\mu D)}{C}\right]$$

then:

$$\Delta = -\frac{2\omega D}{C} + 2B \sin \frac{(\mu D)}{C} \sin\left(\mu t - \frac{\mu D}{C}\right)$$

The return wave ($e$) and a portion of the transmitted wave ($E$) are mixed and a combination voltage $v$ is obtained.

Let $v = b \sin \Delta$ where:

$b$ = constant or:

$$v = b \sin\left[-\frac{2\omega D}{C} + 2B \sin \frac{(\mu D)}{C} \sin\left(\mu t - \frac{\mu D}{C}\right)\right]$$

expanding using the form:

$$\sin(A-B) = \sin A \cos B - \cos A \sin B$$

let $$B = \frac{2\omega D}{C}$$

$$A = M \sin\left(\mu t - \frac{\mu D}{C}\right)$$

where $$M = 2B \sin \frac{(\mu D)}{c}$$

then:

$$v = b\left\{\left[\sin\left[M \sin\left(\mu t - \frac{\mu D}{C}\right)\right]\right]\left[\cos \frac{2\omega D}{C}\right] - \left[\cos\left[M \sin\left(\mu t - \frac{\mu D}{C}\right)\right]\right]\left[\sin \frac{2\omega D}{C}\right]\right\}$$

In terms of Bessel functions using the identities:

$$\sin(x \sin \phi) = 2[J_1(x) \sin \phi + J_3(x) \sin 3\phi + J_5(x) \sin 5\phi \ldots]$$

and:

$$\cos(x \sin \phi) = J_0 x + 2[J_2 x \sin 2\phi + J_4(x) \sin 4\phi + J_6(x) \sin 6\phi \ldots]$$

then expanding $$\sin\left[M \sin\left(\mu t - \frac{\mu D}{C}\right)\right]$$

let $$x = M$$

$$\phi = \mu t - \frac{\mu D}{C}$$

$$\sin M \sin\left(\mu t - \frac{\mu D}{C}\right) =$$

$$2\left[J_1(M) \sin\left(\mu t - \frac{\mu D}{C}\right) + J_3(M) \sin\left(3\mu t - \frac{3\mu D}{C}\right) + J_5(M) \sin\left(5\mu t - \frac{5\mu D}{C}\right) + \cdots\right]$$

similarly:

$$\cos M \sin\left(\mu t - \frac{\mu D}{C}\right) = Jo(M) + 2\left[J_2(M) \cos\left(2\mu t - \frac{2\mu D}{C}\right) + J_4(M) \cos\left(4\mu t - \frac{4\mu D}{C}\right) \cdots\right]$$

from which is derived:

$$v = b\left\{2\left[J_1(M) \sin\left(\mu t - \frac{\mu D}{C}\right) + J_3(M) \sin\left(3\mu t - \frac{3\mu D}{C}\right) + J_5(M) \sin\left(5\mu t - \frac{5\mu D}{C}\right) + \cdots\right]\left[\cos\frac{2\omega D}{C}\right] - \left[Jo(M) + 2\left[J_2(M) \cos\left(2\mu t - \frac{2\mu D}{C}\right) + J_4(M) \cos\left(4\mu t - \frac{4\mu D}{C}\right) + \cdots\right]\right]\left[\sin\frac{2\omega D}{C}\right]\right\}$$

rearranging:

$$v = b\left\{2J_1(M)\left[\sin\left(\mu t - \frac{\mu D}{C}\right)\right]\left[\cos\frac{2\omega D}{C}\right] + 2J_3(M)\left[\sin\left(3\mu t - \frac{3\mu D}{C}\right)\right]\left[\cos\frac{2\omega D}{C}\right] \text{ etc.} \cdots - Jo(M)\left[\sin\frac{2\omega D}{C}\right] - 2J_2(M)\left[\cos\left(2\mu t - \frac{2\mu D}{C}\right)\right]\left[\sin\frac{2\omega D}{C}\right] \text{ etc.} \cdots\right\}$$

expanding using the form:

$$\sin A \cos B = \tfrac{1}{2}[\sin(A+B) + \sin(A-B)]$$

and:

$$\cos A \sin B = \tfrac{1}{2}[\sin(A+B) + \sin(B-A)]$$

let $$A = n\left(\mu t - \frac{\mu D}{C}\right)$$

$$B = \frac{2\omega D}{C}$$

$$v = b\left\{2J_1(M)[1/2]\left[\sin\left(\mu t - \frac{\mu D}{C} + \frac{2\omega D}{C}\right) + \sin\left(\mu t - \frac{\mu D}{C} - \frac{2\omega D}{C}\right)\right] + 2J_3(M)[1/2]\left[\sin\left(3\mu t - \frac{3\mu D}{C} + \frac{2\omega D}{C}\right) + \sin\left(3\mu t - \frac{3\mu D}{C} - \frac{2\omega D}{C}\right)\right] - Jo(M)\left[\sin\frac{2\omega D}{C}\right] - 2J_2(M)(1/2)\left[\sin\left(2\mu t - \frac{2\mu D}{C} + \frac{2\omega D}{C}\right) + \sin\left(\frac{2\omega D}{C} - 2\mu t + \frac{2\mu D}{C}\right)\right] - 2J_4(M)(1/2)\left[\sin\left(4\mu t - \frac{4\mu D}{C} + \frac{2\omega D}{C}\right) + \sin\left(\frac{2\omega D}{C} - 4\mu t + \frac{4\mu D}{C}\right)\right] \pm \cdots\right\}$$

Thus, in general terms:

$$v = b\left\{Jo(M) \sin\left(-\frac{2\omega D}{C}\right) + \sum_{-\infty}^{\infty} Jn(M) \sin\left[n\left(\mu t - \frac{\mu D}{C}\right) - \frac{2\omega D}{C}\right] + \sum_{-\infty}^{\infty} (-1)^n J_n(M) \sin\left[-n\left(\mu t - \frac{\mu D}{C}\right) - \frac{2\omega D}{C}\right]\right\}$$

since:

$$J_{-n}(M) = (-1)^n J_n(M)$$

$$v = b\sum_{-\infty}^{\infty} Jn(M) \sin\left[-\frac{2\omega D}{C} + n\left(\mu t - \frac{\mu D}{C}\right)\right]$$

Expansion of the above expression for the signal output in the mixer 15 and analysis of the frequency components of the signal by such means as Bessel functions reveals that each of the signals has a range character dependent upon M, and that this characteristic is cyclic differing for each value of $n$; as $n$ (the side band number) increase from 0 (the carrier component), so will the distance at which the first signal maximum will occur. More particularly, from the expression for $v$, each side band ($n$ value) amplitude is described by $Jn(M)$ which is a Bessel function of the first kind, order $n$ and argument (M).

It can be seen that M which was defined as $$M = 2B \sin\frac{\mu D}{C}$$

is range dependent. B is the modulation index defined in a FM system as the ratio of deviation to modulating frequency. This, once chosen, is a constant. Thus, the value of M is dependent solely upon D. All other terms are constants.

From this all arguments contain the same value for given values of D. However, the Bessel functions of order $n$ are cyclic, diminishing in amplitude as M increases. As $n$ increases, the beginning of this cyclic behaviour is further delayed.

Since D and M are related, they may be plotted upon the same axis of a Bessel function plot thereby establishing the sideband equalities for various values of D. This is most readily seen by reference to FIG. 2a in which a plot of the carrier component and first side band is shown; it will be recognized that the carrier component is the zero order Bessel function of argument M and that the first side band is likewise the first order Bessel function of argument M. The carrier component of the mixed signal $v$ is found by letting $n=0$ $$v = bJo(M) \sin\left[-\frac{2\omega D}{C}\right]$$

This is seen to consist of a Doppler signal where D is variable. The amplitude function is $Jo(M)$.

The mixer as an example for a C.W. carrier case takes a signal of frequency F which is a local oscillator and a Doppler shifted return signal $F+fd$ and produces a difference signal of $+ fd$, where $fd$ is the Doppler frequency. Thus, it may be said the transmitter carrier frequency is removed but a D.C. potential remains whose amplitude is modulated by $fd$.

In the previous equation, $b$ represents the D.C. level, $$\sin\left(-\frac{2\omega D}{C}\right)$$

the Doppler modulation, and $JoM$ the amplitude. This A.C. signal can be filtered and detected. It will further be understood that a first detection process is performed by the mixer 15 thus causing the negative half cycles of the carrier component, indicated by dashed lines 26, to be inverted so that the detected carrier component in the output of the mixer 15 has a configuration as shown in solid lines in FIG. 2a. The other side bands are likewise detected, the detected first side band being shown in broken lines in FIG. 2a.

Examination of the curves of FIG. 2a where the lowest two adjacent side bands are shown, i.e., the carrier component and the first side band, clearly shows the points 27 of relative amplitude equality greater than zero, it being further seen that these "instants of equality" above zero are a source of range information. It is thus seen that the extraction of range information can be accomplished through the use of comparators 19 arranged to sense the signal equality points greater than zero and respectively to provide output signals responsive thereto, such "instant of equality" signals from comparators 19 being telemetered to the monitoring equipment 24, 25 which provides a separate record of the signals from each comparator 19, as will be hereinafter explained.

It is thus seen that band pass filters 17a and 17b respectively filter out the carrier component and first side band which are in turn respectively fed to equality comparator 19a, which compares the amplitudes of the carrier component and the first side band passed by filters 17a and 17b respectively to provide instant of equality signals 27a as shown in FIG. 2a. Likewise, the first side band filter 17b and the second side band filter 17c are connected to comparator 19b which compares the first and second side bands, second and third side band filters 17c and 17d are connected to comparator 19c which compares the second and third side bands, and so on.

Referring now briefly additionally to FIGS. 2b, c and d, in which the comparison of the first and second side bands, fifth and sixth side bands, and ninth and tenth side bands are respectively shown by way of example, it will be observed that the first amplitude peak of each successively higher side band is progressively farther removed from the ordinate, i.e., at an increasingly longer range. It will further be observed in FIG. 2b that the instant of equality comparison of the first and second side bands passed by filters 17b and 17c by comparator 19b provides instant of equality signals 27b with the instant of equality comparison of the fifth and sixth side bands as shown in FIG. 2c providing instant of equality signals 27c and the comparison of the ninth and tenth side bands as shown in FIG. 2d providing instant of equality signals 27d.

Referring now additionally to FIG. 3, it will be assumed that a target enters the zone of recognition of the system of FIG. 1 and that the target reflectivity is such that the reflected signal exceeds the threshold level (to be hereinafter more fully described in connection with FIG. 4) at 140 feet, the missile in which the system of FIG. 1 is incorporated closing on the target to a range of thirty feet, and missing the same by that distance. FIG. 3 shows a section of chart 28 employed in indicator 25, chart 28 being continuously moving in the direction of the arrow 29 with indicator 25 recording the "instant of equality" signals 27 from each channel of the telemetering transmitter and receiver 20, 24 and thus from each comparator 19, as shown; it is here assumed that filters are provided for the Doppler frequency component and for the side bands 1 through 10, "n" in this case thus being 11 (0 through 10) with ten comparators 19 and ten channels in the telemetering equipment 20, 24 being provided. It will further be seen that with the chart 28 moving in the direction 29, the first marks made on the chart 28 by the recording equipment 25 in each of the channels will appear at the right hand side as viewed in FIG. 3 as the target enters the zone of recognition with the last marks being made at the left hand side of FIG. 3 as the target finally leaves the zone of recognition. It will thus be seen that as the target enters the zone of recognition, the first instant of equality signal from each comparator will be recorded in the respective channel. It will now be observed, with particular reference to FIG. 2d, that after the missile has closed on the target by a small amount, the 9–10 channel can no longer provide instant of equality signals, there being no maximum amplitude peaks in the ninth and tenth side bands closer than 120 feet with the specified frequencies. Thus, instant of equality signals 27d in the 9–10 channel cease to be recorded after the target passes 120 feet, and similarly, the other channels 8–9, 7–8, 6–7, etc. progressively cease to provide instant of equality signals when the target passes their respective inner range limits. Upon arriving at the closest point of approach (assuming there is no collision between the missile and target), the missile progresses away from the target and the data mirrors again providing instant of equality signals starting with the 0–1 channel and progressing to the 9–10 channel as shown in the left hand side of FIG. 3.

It will now be readily seen that the mirror point, i.e., as shown by the dashed line 30 in FIG. 3 is readily recognized as being midway between the closest instant of equality signal and thus the miss-distance is one-half (½) the distance between the closest two instant of equality signals, i.e., as indicated at 31 in FIG. 3.

It will now be readily seen that the range information provided by my system may be utilized in applications other than miss-distance indicators, and it will further be seen that range information, per se, is provided merely by utilizing only the 0 and 1 side band signals, i.e., the 0–1 channel.

Turning now to FIGS. 4 and 5, the mode of operation of the "instant of equality" comparators 19 will be explained. Here, comparator 19 is shown as comprising a first "hard" vacuum tube 33 and a gaseous discharge, i.e., thyratron-type tube 34. The grid 35 of tube 33 is connected to one input terminal 36 which in turn is connected to the detector 18 of one side band channel, for example the first side band passed by filter 17b; in explaining the mode of operation of the comparators, this will be referred to as channel "A." The cathode 37 of tube 33 is connected to ground by cathode resistor 38 while plate 39 is connected to a suitable source 40 of positive plate potential. A fixed bias for tube 33 which establishes the threshold level, shown by the dashed lines 42 in FIG. 5, is provided by resistor 43 connected between the source of positive plate potential 40 and cathode 37; it will be seen that resistors 43 and 38 constitute a voltage divider connected between the source of positive plate potential and ground, with cathode 37 being connected to the midpoint therebetween. Grid 44 of thyratron 34, together with cathode 45 are connected to cathode 37 of tube 33 and control grid 46 is connected to the other input terminal 47 adapted to be connected to the detector 18 of the adjacent side band channel, for example the side band passed by the filter 17c; this channel will be identified as channel "B." Plate 48 of thyratron 34 is connected to the positive source of plate potential 40 by plate resistor 49. Plate 48 is connected to output terminal 50 by a coupling capacitor 52, output terminal 50 being in turn adapted to be connected to the telemetering transmitter 20. Output terminal 50 is also connected to ground by resistor 53.

The values of resistors 43 and 38 are suitably chosen so that tube 33 is normally biased to cut-off, i.e., so that a voltage must be applied to input terminal 36 in excess of the voltage drop across resistor 38 in order to cause tube 33 to conduct. It will now be seen that as the missile in which my miss-distance indicating system is installed closes on the target in the direction of the arrow 54 in FIG. 5, the side band signal "A" at its peak 55 does not have an amplitude above the threshold level established by the voltage dividers 43 and 38 and thus tube 33 will not fire. The bias provided by resistors 43 and 38 is likewise applied to thyratron 34 thus thyratron 34 is cut-off by the same bias when tube 33 is not fired. Now it will be seen that when the side band of channel "A" reaches its next peak 56 responsive to the missile approaching the target, tube 33 will fire and conduct heavily, thus providing an increased voltage drop across resistor 38 which in turn is applied to grid 44 and cathode 45 of thyratron 34. Thus, as the amplitude of the side band "B" applied to grid 46 of thyratron 34 increases, it will be seen that thyratron 34 will fire approximately at point 27 at which the amplitudes of side bands "A" and "B" are equal; it will be recalled that thyratrons are commercially available, such as 5643 which will fire on a one-half volt differential between the cathode and grid voltage. It will be seen that firing of the thyratron 34 will produce a voltage pulse across resistor 53 and at the output terminal 50, it being this "instant of equality" signal or pulse which is transmitted by telemetering transmitter 20 to the monitoring station 11. It will further be seen that immediately after firing of the thyratron 34, the amplitude of the channel "A" side band signal will decrease sufficiently to cut-off tube 33 so that the fixed threshold-level bias is again established on grid 44 which cuts off thyratron 34. Thyratron 34 will be caused to fire again, however, on the occasion of each successive instant of equality points between the amplitudes of the "A" and "B" side band signals as the missile closes in on the target and likewise as the missile goes away from the target until the amplitude peaks of the "A" channel no longer exceed the threshold level. It will be readily understood that the specific voltage comparator circuit of FIG. 4 is shown for illustrative purposes only, and that other comparator circuits for providing an output signal responsive to equality of amplitude of two input signals may readily be employed in accordance with my invention.

While I have described above the principles of my invention in connection with specific apparatus, it is to be clearly understood that this description is made only by way of example and not as a limitation to the scope of my invention.

What is claimed is:

1. A miss distance indicator system comprising: a source of periodically varying signals; means for frequency modulating a carrier frequency with said varying signals; means for transmitting the frequency modulated signal; means for receiving said frequency modulated signal reflected from a distant object; means for mixing the received signal and a portion of the transmitted signal; means for separating at least three pairs of adjacent side bands contained in the output from said mixing means; and means for comparing the amplitudes of each of said pairs of adjacent side bands.

2. A miss distance indicator system comprising: a source of sine wave signals; means for frequency modulating a carrier frequency with said sine wave signals; means for transmitting the frequency modulated signal; means for receiving said frequency modulated signal reflected from a distant object; means for mixing the received signal and a portion of the transmitted signal; filter means for respectively passing at least three pairs of adjacent side bands contained in the output of said mixing means; and amplitude comparator means responsive to the amplitudes of each of said pairs of adjacent side bands for providing an output signal at each instant of equality greater than zero between said adjacent side bands.

3. The system of claim 2 further comprising recording means coupled to all of said comparator means for recording said instant of equality signals from each of said comparator means.

4. A miss distance indicator system comprising: a source of sine wave signals; means for frequency modulating a carrier frequency with said sine wave signals; means for transmitting the frequency modulated signal; means for receiving said frequency modulated signal reflected from a distant object; means for mixing the received signal and a portion of the transmitted signal; at least four band pass filters coupled to said mixing means for respectively passing at least three pairs of adjacent side bands contained in the output of said mixing means; and at least three voltage comparators each coupled to two of said filters for adjacent side bands and responsive to the amplitudes thereof for providing an output signal at each instant of equality greater than zero between said adjacent side bands.

5. The combination of claim 4 in which said comparators respectively include threshold signal level providing means whereby an output signal is not provided responsive to equality of said adjacent side bands at amplitudes below said threshold level.

6. A miss distance indicator system comprising: a frequency modulated transmitter; a modulator providing sine wave signals and coupled to said transmitter for frequency modulating a carrier frequency with said sine wave signals; transmitting antenna means coupled to said transmitter for continuously radiating the frequency modulated signal toward a distant object; receiving antenna means for receiving the frequency modulated signal reflected from said distant object; a mixer having its input circuits respectively coupled to said transmitter and to said receiving antenna for mixing a portion of the transmitted signal and the received signal thereby providing in its output circuit an output signal containing a series of side bands including a Doppler frequency component and harmonics of the sine wave modulating frequency respectively; video amplifier means having its input circuit coupled to the output circuit of said mixer; at least four band pass filters respectively coupled to the output circuit of said amplifier for respectively passing at least three pairs of adjacent side bands; detector means respectively coupled to each of said filters for detecting the side bands passed thereby; a plurality of voltage comparators respectively coupled to the detectors for adjacent pairs of side bands responsive to the amplitudes of said adjacent pairs of side bands for respectively providing output signals at each instant of equality greater than zero between said adjacent side bands.

7. The system of claim 6 further comprising a recorder having a continuously moving chart and a plurality of recording elements respectively cooperating with said chart to provide visual indications thereon respectively responsive to energizing signals; and means respectively coupling said comparators to said recording means for respectively energizing the same responsive to said instant of equality signals.

References Cited in the file of this patent
UNITED STATES PATENTS

| | | |
|---|---|---|
| 2,453,169 | Varian | Nov. 9, 1948 |
| 2,907,023 | Skinner | Sept. 29, 1959 |
| 2,931,030 | Rey | Mar. 29, 1960 |
| 3,068,471 | Erst | Dec. 11, 1962 |

UNITED STATES PATENT OFFICE
CERTIFICATE OF CORRECTION

Patent No. 3,173,138                                                          March 9, 1965

Stephen J. Erst

It is hereby certified that error appears in the above numbered patent requiring correction and that the said Letters Patent should read as corrected below.

Column 1, line 39, for "mis-distance" read -- miss-distance --; column 3, line 31, for "f" read -- $f$ --, in italics; same column 3, lines 41, 53, 61, 62, 65, 66, 69, 72, 74 and 75, column 4, lines 20, 30, 33, 36 and 44, column 5, lines 31, 33 and 39, and column 6, line 15, for "B", in italics, each occurrence, read -- $\beta$ --; column 3, line 42, for "w", in italics, read -- $\omega$ --; line 55, for "c", in italics, read -- $C$ --, in italics; line 61, for "α" read -- $\omega$ --; same column 3, line 66, after "T", in italics, second occurrence, insert a closing parenthesis; column 4, line 44, for "c", in italics, read -- $C$ --, in italics; line 50, after "]", last occurrence, insert a -- } --; same column 4, lines 52 and 71, and column 5, lines 9, 20 and 41, for "J,", in italics, each occurrence, read -- $J_1$ --, in italics; column 4, line 56, for "Jox", in italics, read -- $J_o(x)$ --, in italics; same column 4, line 56, for "$J_2$x", in italics, read -- $J_2(x)$ --, in italics; column 5, lines 3, 14, 25, 49 and 62, and column 6, lines 38 and 41, for "Jo", in italics, each occurrence, read -- $J_0$ --, in italics; column 5, lines 65, 71 and 74, for "Jn", in italics, each occurrence, read -- $J_n$ --, in italics; line 68, for "(-1)n", in italics, read -- $(-1)^n$ --, in italics; column 6, line 54, for "JoM", in italics, read -- $J_0(M)$ --, in italics; column 9, lines 23, 34 and 51, and column 10, line 15, for "miss distance", each occurrence, read -- miss-distance --.

Signed and sealed this 14th day of September 1965.

(SEAL)
Attest:

ERNEST W. SWIDER                                        EDWARD J. BRENNER
Attesting Officer                                   Commissioner of Patents